United States Patent
Stunnebrink et al.

(10) Patent No.: US 12,252,902 B2
(45) Date of Patent: Mar. 18, 2025

(54) PORTABLE LOCK APPARATUS WITH STATUS INDICATOR

(71) Applicant: Schlage Lock Company LLC, Carmel, IN (US)

(72) Inventors: Marco Stunnebrink, Horssen (NL); Arthur Van Beek, Utrecht (NL)

(73) Assignee: Schlage Lock Company LLC, Carmel, IN (US)

( * ) Notice: Subject to any disclaimer, the term of this patent is extended or adjusted under 35 U.S.C. 154(b) by 200 days.

(21) Appl. No.: 17/951,694

(22) Filed: Sep. 23, 2022

(65) Prior Publication Data
US 2024/0102317 A1    Mar. 28, 2024

(51) Int. Cl.
| | |
|---|---|
| *E05B 41/00* | (2006.01) |
| *B62H 5/14* | (2006.01) |
| *E05B 67/22* | (2006.01) |
| *E05B 67/28* | (2006.01) |

(52) U.S. Cl.
CPC .............. *E05B 41/00* (2013.01); *B62H 5/14* (2013.01); *E05B 67/22* (2013.01); *E05B 67/28* (2013.01)

(58) Field of Classification Search
CPC .......... E05B 41/00; E05B 67/00; E05B 67/06; E05B 67/22; E05B 67/24; E05B 67/26; E05B 67/28; B62H 5/00; B62H 5/14; B62H 5/141
USPC .......................................................... 70/233
See application file for complete search history.

(56) References Cited

U.S. PATENT DOCUMENTS

| | | | | | |
|---|---|---|---|---|---|
| 2,855,028 | A | * | 10/1958 | Matthews | B60R 22/357 |
| | | | | | 242/384.7 |
| 2,921,353 | A | * | 1/1960 | Cushman | B64D 17/32 |
| | | | | | 24/632 |
| 4,543,806 | A | * | 10/1985 | Papandrea | E05B 67/006 |
| | | | | | 242/380 |
| 4,545,223 | A | * | 10/1985 | Poutiainen | E05B 67/24 |
| | | | | | 70/52 |
| 4,635,782 | A | * | 1/1987 | Wieth | G07F 7/0663 |
| | | | | | 194/212 |
| 5,197,310 | A | * | 3/1993 | Pedersen | B62H 5/147 |
| | | | | | 70/227 |

(Continued)

FOREIGN PATENT DOCUMENTS

| | | |
|---|---|---|
| CN | 108691459 A | 10/2018 |
| DE | 69001894 T2 | 11/1993 |

(Continued)

OTHER PUBLICATIONS

EP-3064419-A1, Jung (Year: 2016).*
WO-2021113493-A2, Holtgrewe et al. (Year: 2021).*

*Primary Examiner* — Nathan Cumar
(74) *Attorney, Agent, or Firm* — Taft Stettinius & Hollister LLP

(57) ABSTRACT

An example ring lock generally includes a housing, a shackle, a lock mechanism, and an indicator. The shackle is mounted to the housing for movement between a first position and a second position. The lock mechanism is configured to selectively retain the shackle in at least one of the first position or the second position. The indicator is operable to selectively display an indicium related to an open/closed state of the ring lock. The indicator is configured to display the indicium when the shackle is in the first position, and is configured to not display the indicium when the shackle is in the second position.

18 Claims, 2 Drawing Sheets

(56) References Cited

U.S. PATENT DOCUMENTS

| | | | |
|---|---|---|---|
| 8,854,207 B2* | 10/2014 | Williams | B62H 5/003 340/568.1 |
| 9,512,649 B2* | 12/2016 | Mohamed | E05B 47/0012 |
| 9,669,888 B1* | 6/2017 | Singleton | E05B 71/00 |
| 9,976,321 B2* | 5/2018 | Chen | B62H 5/003 |
| 2020/0361552 A1 | 11/2020 | Radenbaugh et al. | |

FOREIGN PATENT DOCUMENTS

| | | |
|---|---|---|
| DE | 3543201 C2 | 1/1995 |
| DE | 10240558 B4 | 4/2010 |
| DE | 10240570 B4 | 4/2010 |
| DE | 102010008054 A1 | 8/2011 |
| DE | 102012102896 A1 | 10/2013 |
| DE | 202015104232 U1 | 9/2015 |
| DE | 202015104618 U1 | 10/2015 |
| DE | 202015105949 U1 | 12/2015 |
| DE | 202016101782 U1 | 6/2016 |
| DE | 102018006576 A1 | 2/2020 |
| DE | 202020106957 U1 | 1/2021 |
| EP | 728659 B1 | 5/1999 |
| EP | 1418302 B1 | 8/2005 |
| EP | 1834864 A1 | 9/2007 |
| EP | 1416110 B1 | 5/2008 |
| EP | 1717135 B1 | 2/2009 |
| EP | 2842847 B1 | 10/2015 |
| EP | 2962919 A1 | 1/2016 |
| EP | 2962920 A1 | 1/2016 |
| EP | 2842846 B1 | 4/2016 |
| EP | 3064419 A1 * | 9/2016 |
| EP | 3064419 B1 | 6/2018 |
| EP | 3566933 A1 | 11/2019 |
| NL | 2000149 C2 | 1/2008 |
| NL | 2022574 B1 | 8/2020 |
| WO | 2014089919 A1 | 6/2014 |
| WO | 2021038059 A1 | 3/2021 |

* cited by examiner

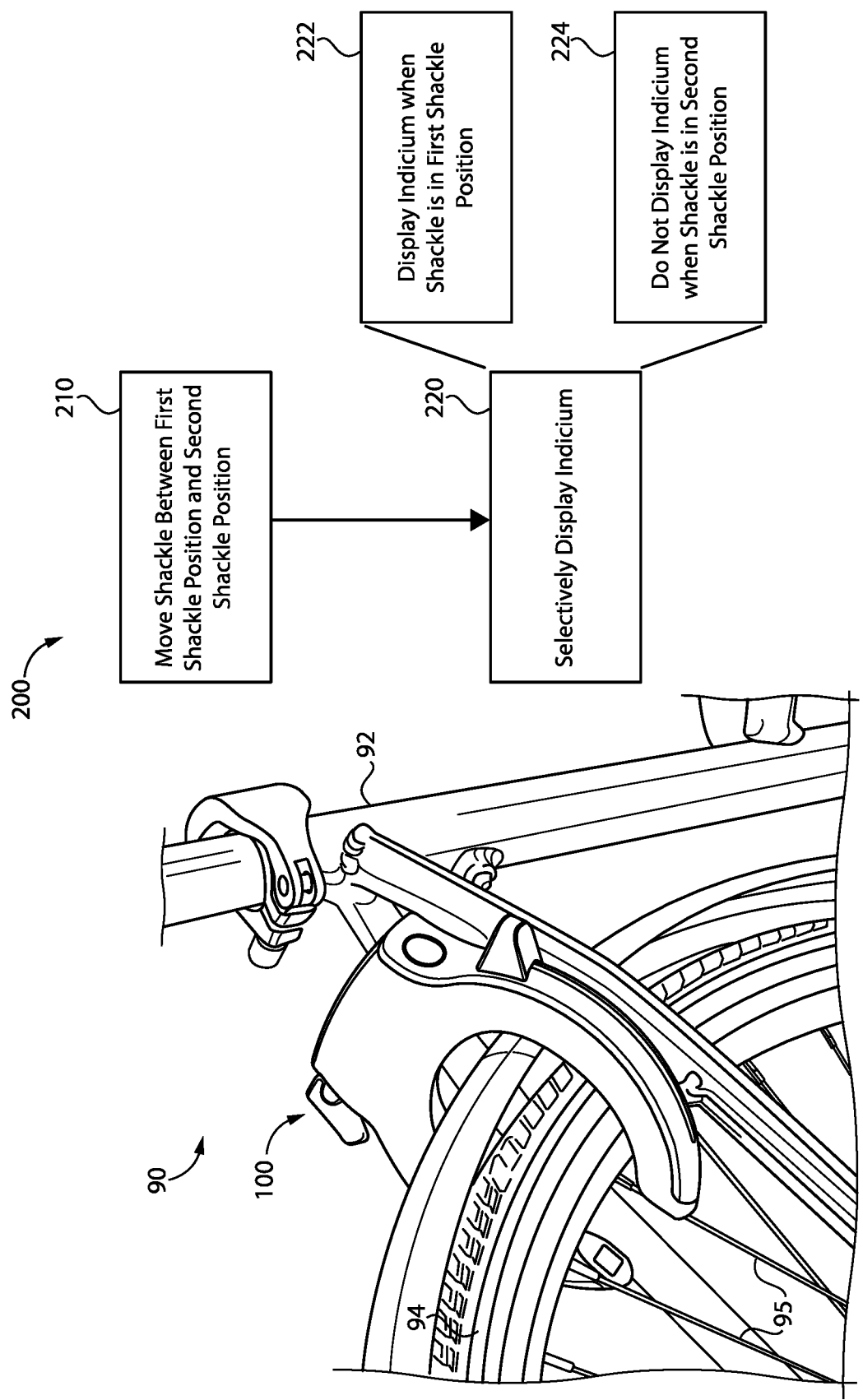

ND STATUS INDICATOR

PORTABLE LOCK APPARATUS WITH STATUS INDICATOR

TECHNICAL FIELD

The present disclosure generally relates to status indicators for portable lock apparatuses, and more particularly but not exclusively relates to ring locks including such status indicators.

BACKGROUND

Ring locks are typically configured for installation to wheeled vehicles such as bicycles, and may be utilized to discourage theft of such wheeled vehicles. It has been found that one limitation associated with existing ring locks is that it may be difficult for the user to determine that the ring lock has been locked. For these reasons among others, there remains a need for further improvements in this technological field.

SUMMARY

An example ring lock generally includes a housing, a shackle, a lock mechanism, and an indicator. The shackle is mounted to the housing for movement between a first position and a second position. The lock mechanism is configured to selectively retain the shackle in at least one of the first position or the second position. The indicator is operable to selectively display an indicium related to an open/closed state of the ring lock. The indicator is configured to display the indicium when the shackle is in the first position, and is configured to not display the indicium when the shackle is in the second position. Further embodiments, forms, features, and aspects of the present application shall become apparent from the description and figures provided herewith.

BRIEF DESCRIPTION OF THE FIGURES

FIG. 3 illustrates the ring lock of FIGS. 1 and 2 mounted to a wheeled transportation device such as a bicycle.

FIG. 4 is a schematic block diagram of a process according to certain embodiments.

DETAILED DESCRIPTION OF ILLUSTRATIVE EMBODIMENTS

Figure 2:
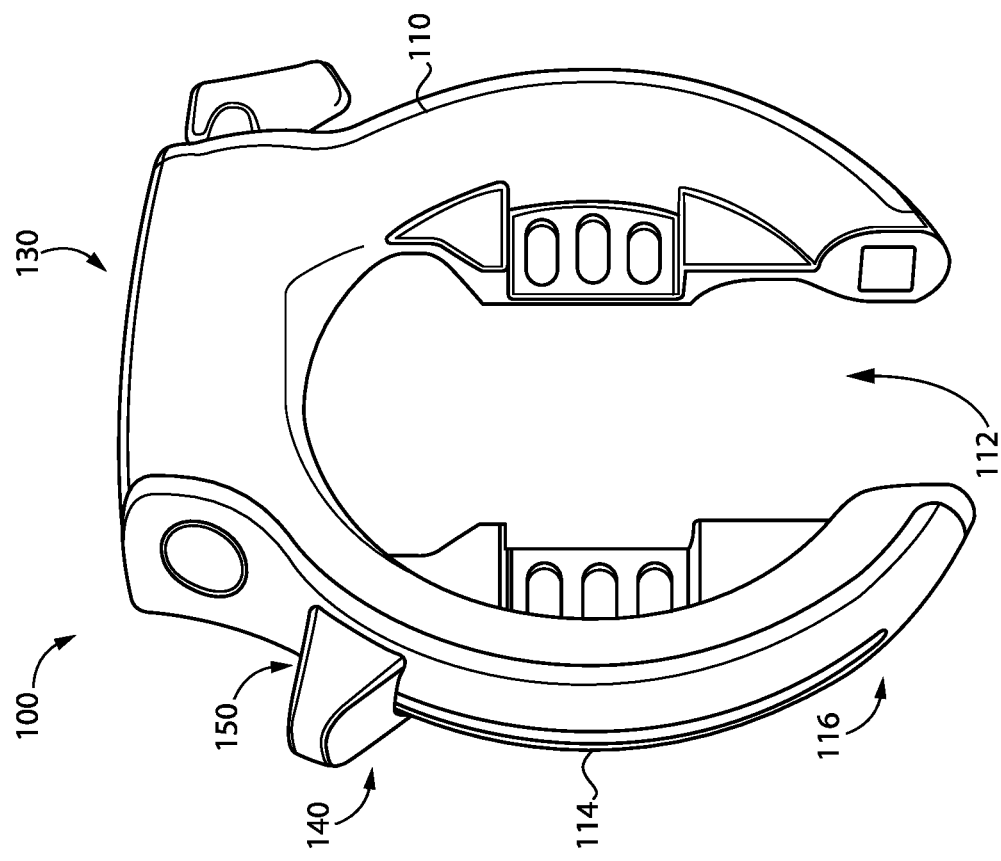
FIG. 2 is a perspective illustration of the ring lock illustrated in FIG. 1, with the ring lock in an open condition.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

Figure 1:
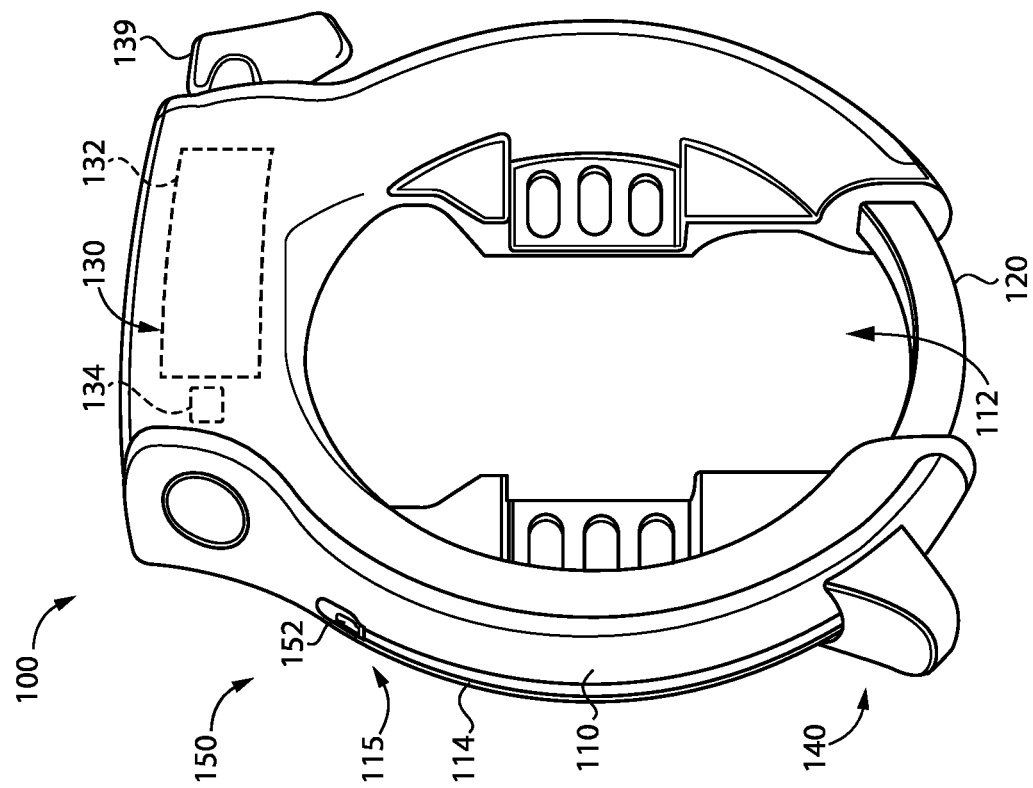
FIG. 1 is a perspective illustration of a ring lock according to certain embodiments in a closed condition.

With reference to FIGS. 1 and 2, illustrated therein is a portable lock apparatus in the form of a ring lock 100 according to certain embodiments. The ring lock 100 generally includes a housing 110, a shackle 120 movably mounted for movement relative to the housing 110 between a closed position (FIG. 1) and an open position (FIG. 2), a lock mechanism 130 operable to selectively retain the shackle 120 in the closed position, an actuator 140 operable to move the shackle 120 between the open position and the closed position, and an indicator 150 configured to selectively display an indicium 152 related to an open/closed state of the ring lock 100.

With additional reference to FIG. 3, the housing 110 encloses one or more other components of the ring lock 100, and provides a base to which one or more components of the ring lock 100 may be mounted. In the illustrated form, the housing 110 is configured for mounting to a frame 92 of a wheeled transportation device 90 (e.g., a bicycle or motorcycle) adjacent a wheel 94 of the transportation device 90, and includes an opening 112 operable to receive a portion of the wheel 94. In the illustrated form, the housing 110 defines an arcuate guide path 114 along which the actuator 140 moves to open and close the shackle 120.

The shackle 120 is mounted for movement relative to the housing 110 between a closed position (FIG. 1) and an open position (FIG. 2), and is operable to be retained in the closed position by the lock mechanism 130. In certain embodiments, the lock mechanism 130 may also be operable to selectively retain the shackle 120 in its open position, as described herein. With the shackle 120 in the closed position, a portion of the wheel 94 of the transportation device 90 is captured within the enclosed opening 112, and the shackle 120 interferes with spokes 95 of the wheel 94 to prevent rotation of the wheel 94 relative to the frame 92. When the shackle 120 is in its open position, the shackle 120 is received in the housing 110, and the wheel 94 is free to rotate. The actuator 140 is connected with the shackle 120, and facilitates manual manipulation of the shackle 120 between its open position and its closed position.

The lock mechanism 130 is configured to selectively retain the shackle 120 in its closed position, and may further be operable to selectively retain the shackle 120 in its open position. The lock mechanism 130 generally includes a lock core 132 and a latch 134. The lock core 132 is operable to selectively retain the latch 134 in a latching position in which the latch 134 engages a notch of the shackle 120. For example, the shackle 120 may include a closed position notch that is engaged by the latch 134 when the shackle 120 is in its closed position and the lock mechanism 130 is locked. In certain forms, the shackle 120 may further include an open position notch that is engaged by the latch 134 when the shackle 120 is in its open position and the lock mechanism 130 is locked. When the lock mechanism 130 is in its locked state, the shackle 120 is retained in its current position (e.g., the open position or the closed position). When the lock mechanism 130 is in its unlocked state, the shackle 120 is movable between its open position and its closed position.

In certain forms, the lock core 132 may be provided in the form of a mechanical core. In the illustrated form, the lock core 132 is provided in the form of a lock cylinder that is operable by an appropriate key 139. It is also contemplated that the lock core 132 may be another form of mechanical core, such as one including a mechanical combination lock. Additionally or alternatively, the lock core 132 may include electronic features that facilitate the transition of the lock mechanism 130 between its locked and unlocked states. For example, the lock core 132 may include a credential reader and/or a wireless communication device operable to communicate with an external device. A credential reader may, by way of illustration, include a biometric credential reader operable to read biometric credentials, a card reader operable to read a credential embodied in tangible form, and/or a keypad operable to receive credential input. A wireless communication device may, for example, be configured to communicate with an external device via Bluetooth (e.g., Bluetooth Low Energy), WiFi, Zigbee, and/or another wireless communication protocol.

The actuator 140 is movably mounted to the housing 110 and is coupled with the shackle 120 such that movement of the actuator 140 between a first actuator position and a second actuator position drives the shackle 120 between a first shackle position and a second shackle position. More particularly, the actuator 140 has an opening position correlated with the open position of the shackle 120, and a closing position correlated with the closed position of the shackle 120. As described herein, the actuator 140 selectively obscures and exposes the indicator 150 to thereby provide a visual indication regarding the open/closed condition of the ring lock 100.

The indicator 150 includes an indicium 152 relating to the open/closed condition of the ring lock 100, and is configured to selectively display the indicium 152 based upon the open/closed position of the shackle 120. In various embodiments, the indicium 152 may include a color, a symbol, a word, a letter, and/or another form of indicium. As one example, the indicium 152 may include a color that is different from the color of the housing 110. In certain forms, the color of the indicium 152 may be selected to promote visibility. For example, the indicium 152 may be provided with a fluorescent color. It is also contemplated that the material of the indicator 150 may be selected to promote visibility. For example, the indicator 150 may include a retroreflective material.

As another example form for the indicator 150, the indicium 152 may include an icon of a padlock. In embodiments in which the indicium 152 is displayed when the shackle 120 is in its open position, the padlock icon may show the padlock as open. In embodiments in which the indicium 152 is displayed when the shackle 120 is in its closed position, the padlock icon may show the padlock as closed.

During operation of the ring lock 100, the ring lock 100 may be in the closed condition illustrated in FIG. 1. In this condition, the shackle 120 is in its closed position, and the actuator 140 is in its closing position. With the actuator 140 in its closing position, the actuator 140 does not obscure the indicator 150 such that the indicium 152 is visible to the user, thereby providing a visual indication that the ring lock 100 is in its closed condition. When the lock mechanism 130 is in its unlocked state, the actuator 140 may be moved along the arcuate path 114 to its opening position, thereby moving the shackle 120 to its open position and at least partially covering the indicator 150.

FIG. 2 illustrates the ring lock 100 in the open condition. In this condition, the shackle 120 is in its open position, and the actuator 140 is in its opening position. With the actuator 140 in its opening position, the actuator 140 obscures the indicator 150 such that the indicium 152 is not visible to the user. This may indicate to the user that the shackle 120 is in its open position, and the ring lock 100 is in its open condition.

As should be evident from the foregoing, the shackle 120 is movable relative to the housing 110 between a first position, in which the indicium 152 is displayed, and a second position, in which the indicium 152 is obscured. In the illustrated form, the indicium 152 relates to the closed condition, and the first position of the shackle 120 is the closed position such that the indicium 152 is displayed when the shackle 120 is in its closed position. It is also contemplated that the indicium 152 may relate to the open condition of the ring lock 100. In such forms, the first position of the shackle 120 may be the open position such that the indicium 152 is displayed when the shackle 120 is in its open position. For example, while the illustrated indicator 150 is provided at one end 115 of the arcuate path 114 such that the actuator 140 obscures the indicium 152 when in its opening position, an additional or alternative indicator may be provided at the opposite end 116 of the arcuate path 114 such that the actuator 140 obscures the additional or alternative indicator when the actuator 140 is in its closing position.

In the illustrated form, the indicium 152 is always present, and is only selectively displayed. More particularly, the indicium 152 is provided on the housing 110 at the first end 115 of the guide path 114, is exposed when the shackle 120 is in its closed position, and is obscured when the shackle 120 is in its open position. It is also contemplated that the indicium 152 may be selectively displayed in another manner. As one example, the indicium 152 may be provided in the form of a light source that is activated when the shackle 120 is in a first shackle position, and which is deactivated when the shackle 120 is in a second shackle position. The ring lock 100 may, for example, include a switch or other sensor operable to detect the position of the shackle 120 and/or the actuator 140, and control circuitry configured to activate the light source based upon the state of the switch or other sensor.

With additional reference to FIG. 4, an exemplary process 200 that may be performed using the ring lock 100 is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 200 is described herein with specific reference to the ring lock 100 illustrated in FIGS. 1 and 2, it is to be appreciated that the process 200 may be performed with a portable lock apparatus having additional or alternative features.

The process 200 may be involve operating a ring lock including a housing, a shackle movably mounted to the housing, and an indicium. For example, the process 200 may involve operating the ring lock 100, which generally includes a housing 110, a shackle 120 movably mounted to the housing 110, and an indicium 152. In certain embodiments, the ring lock may further include an actuator, such as the actuator 140.

The process 200 may include block 210, which generally involves moving the shackle between a first shackle position and a second shackle position. One of the first shackle position or the second shackle position is a closed position, and the other of the first shackle position or the second shackle position is an open position. In certain embodiments, the moving of block 210 may be performed in response to movement of an actuator between a first actuator position and a second actuator position. For example, block 210 may involve moving the shackle 120 between its closed position (FIG. 1) and its open position (FIG. 2) in response to movement of the actuator 140 between its closing position (FIG. 1) and its opening position (FIG. 2).

The process 200 may include block 220, which generally involves selectively displaying the indicium. In the illustrated form, block 220 includes block 222, which generally involves displaying the indicium, and block 224, which generally involves not displaying the indicium. More particularly, block 222 generally involves displaying the indicium when the shackle is in the first shackle position, and block 224 generally involves not displaying the indicium when the shackle is in the second shackle position. In the illustrated form, the first shackle position is the closed position and the second shackle position is the open position, such that block 222 involves displaying the indicium 152 when the shackle 120 is in the closed position and block 224 involves not displaying the indicium 152 when the shackle 120 is in the open position. It is also contemplated that this configuration may be reversed, such that block 222 involves displaying the indicium 152 when the shackle 120 is in the open position and block 224 involves not displaying the indicium 152 when the shackle 120 is in the closed position.

In the illustrated form, the displaying of block 222 involves exposing the indicium 152 to view by a user, and block 224 involves obscuring the indicium 152 from view by the user. As noted above, however, it is also contemplated that the indicium may be selectively displayed in another manner. As one example, the displaying of block 222 may involve activating or otherwise illuminating a light source, and the not displaying of block 224 may involve deactivating or otherwise darkening the light source.

Although certain embodiments described herein are described with specific reference to the ring lock 100 illustrated in FIGS. 1 and 2, it should be appreciated that the concepts described herein may be utilized in connection with a portable lock apparatus of another configuration, such as a U-lock, a cable lock, a chain lock, or another form of portable lock apparatus.

Certain embodiments of the present application relate to a ring lock, comprising: a housing; a shackle mounted to the housing for movement between a first position and a second position; a lock mechanism configured to selectively retain the shackle in at least one of the first position or the second position; and an indicator operable to selectively display an indicium related to an open/closed condition of the ring lock, wherein the indicator is configured to display the indicium when the shackle is in the first position, and wherein the indicator is configured to not display the indicium when the shackle is in the second position.

In certain embodiments, the ring lock further comprises an actuator coupled with the shackle and operable to move the shackle between the first position and the second position when the lock mechanism is unlocked; wherein the indicium is not obscured by the actuator when the shackle is in the first position; and wherein the indicium is obscured by the actuator when the shackle is in the second position.

In certain embodiments, the housing defines an arcuate path along which the actuator is operable to travel; and wherein the indicator is positioned at one end of the arcuate path.

In certain embodiments, a visible portion of the housing comprises a first color; and wherein the indicium comprises a second color different from the first color.

In certain embodiments, the first position is a closed position and the second position is an open position.

In certain embodiments, the lock mechanism is operable to selectively retain the shackle in at least the second position.

In certain embodiments, the housing defines a guide path along which an actuator travels during movement of the shackle between the first position and the second position; and wherein the indicium is positioned at one end of the guide path.

Certain embodiments of the present application relate to a wheeled transportation device comprising the ring lock, the wheeled transportation device further comprising a frame and a wheel rotatably mounted to the frame; wherein the housing is secured to the frame; and wherein, with the shackle in a closed position, a portion of the wheel is enclosed within the ring lock.

Certain embodiments of the present application relate to a portable lock apparatus, comprising: a housing; a shackle movable relative to the housing between a first position and a second position, wherein one of the first position or the second position is a closed position, and wherein the other of the first position or the second position is an open position; an actuator operable to move the shackle between the open position and the closed position; and an indicator configured to selectively display an indicium; wherein the actuator exposes the indicium when the shackle is in the first position; and wherein the actuator obscures the indicium when the shackle is in the second position.

In certain embodiments, the housing defines a guide path along which the actuator travels to move the shackle between the first position and the second position; and wherein the indicator is positioned at one end of the guide path.

In certain embodiments, the guide path is arcuate.

In certain embodiments, the first position is the closed position and the second position is the open position.

In certain embodiments, the portable lock apparatus further comprises a lock mechanism operable to selectively retain the shackle in the closed position.

In certain embodiments, at least a portion of the housing is a first color; and wherein the indicium comprises a second color different from the first color.

In certain embodiments, the shackle is movably coupled to the housing.

Certain embodiments of the present application relate to a method of operating a ring lock including a housing, a shackle movably mounted to the housing, and an indicium, the method comprising: moving the shackle between a first shackle position and a second shackle position, wherein one of the first shackle position or the second shackle position is a closed position, and wherein the other of the first shackle position or the second shackle position is an open position; and selectively displaying the indicium, comprising: displaying the indicium when the shackle is in the first shackle position; and not displaying the indicium when the shackle is in the second shackle position.

In certain embodiments, the ring lock further comprises an actuator coupled with the shackle; wherein moving the shackle between the first shackle position and the second shackle position is performed in response to movement of the actuator between a first actuator position and a second actuator position; wherein displaying the indicium when the shackle is in the first shackle position comprises exposing the indicium when the actuator is in the first actuator position; and wherein not displaying the indicium when the shackle is in the second shackle position comprises covering the indicium with the actuator when the actuator is in the second actuator position.

In certain embodiments, the indicium relates to a closed condition of the ring lock; wherein the first shackle position is the closed position; and wherein the second shackle position is the open position.

In certain embodiments, displaying the indicium comprises exposing the indicium; and wherein not displaying the indicium comprises obscuring the indicium.

In certain embodiments, at least a portion of the housing is a first color; and wherein the indicium comprises a second color different from the first color.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A ring lock, comprising:
   a housing;
   a shackle mounted to the housing for movement between a first position and a second position;
   a lock mechanism configured to selectively retain the shackle in at least one of the first position or the second position;
   an actuator coupled with the shackle and operable to move the shackle between the first position and the second position when the lock mechanism is unlocked; and
   an indicator operable to selectively display an indicium related to an open/closed condition of the ring lock, wherein the indicator is configured to display the indicium when the shackle is in the first position, and wherein the indicator is configured to not display the indicium when the shackle is in the second position;
   wherein the indicium is not obscured by the actuator when the shackle is in the first position; and
   wherein the indicium is obscured by the actuator when the shackle is in the second position.

2. The ring lock of claim 1, wherein the housing defines an arcuate path along which the actuator is operable to travel; and
   wherein the indicator is positioned at one end of the arcuate path.

3. The ring lock of claim 1, wherein a visible portion of the housing comprises a first color; and
   wherein the indicium comprises a second color different from the first color.

4. The ring lock of claim 1, wherein the first position is a closed position and the second position is an open position.

5. The ring lock of claim 1, wherein the lock mechanism is operable to selectively retain the shackle in at least the second position.

6. The ring lock of claim 1, wherein the housing defines a guide path along which an actuator travels during movement of the shackle between the first position and the second position; and
   wherein the indicium is positioned at one end of the guide path.

7. A wheeled transportation device comprising the ring lock of claim 1, the wheeled transportation device further comprising a frame and a wheel rotatably mounted to the frame;
   wherein the housing is secured to the frame; and
   wherein, with the shackle in a closed position, a portion of the wheel is enclosed within the ring lock.

8. A portable lock apparatus, comprising:
   a housing;
   a shackle movable relative to the housing between a first position and a second position, wherein one of the first position or the second position is a closed position, and wherein the other of the first position or the second position is an open position;
   an actuator operable to move the shackle between the open position and the closed position; and
   an indicator configured to selectively display an indicium;
   wherein the actuator exposes the indicium when the shackle is in the first position; and
   wherein the actuator obscures the indicium when the shackle is in the second position.

9. The portable lock apparatus of claim 8, wherein the housing defines a guide path along which the actuator travels to move the shackle between the first position and the second position; and wherein the indicator is positioned at one end of the guide path.

10. The portable lock apparatus of claim 9, wherein the guide path is arcuate.

11. The portable lock apparatus of claim 8, wherein the first position is the closed position and the second position is the open position.

12. The portable lock apparatus of claim 8, further comprising a lock mechanism operable to selectively retain the shackle in the closed position.

13. The portable lock apparatus of claim 8, wherein at least a portion of the housing is a first color; and wherein the indicium comprises a second color different from the first color.

14. The portable lock apparatus of claim 8, wherein the shackle is movably coupled to the housing.

15. A method of operating a ring lock including a housing, a shackle movably mounted to the housing, an actuator coupled with the shackle, and an indicium, the method comprising:

in response to movement of the actuator between a first actuator position and a second actuator position, moving the shackle between a first shackle position and a second shackle position, wherein one of the first shackle position or the second shackle position is a closed position, and wherein the other of the first shackle position or the second shackle position is an open position; and selectively displaying the indicium, comprising:

exposing the indicium when the actuator is in the first actuator position, thereby displaying the indicium when the shackle is in the first shackle position; and covering the indicium with the actuator when the actuator is in the second actuator position, thereby obscuring the indicium when the shackle is in the second shackle position.

16. The method of claim 15, wherein the indicium relates to a closed condition of the ring lock;

wherein the first shackle position is the closed position; and wherein the second shackle position is the open position.

17. The method of claim 15, wherein displaying the indicium comprises exposing the indicium; and wherein not displaying the indicium comprises obscuring the indicium.

18. The method of claim 15, wherein at least a portion of the housing is a first color; and wherein the indicium comprises a second color different from the first color.

* * * * *